(12) United States Patent
Ritter

(10) Patent No.: US 10,384,190 B2
(45) Date of Patent: Aug. 20, 2019

(54) TUBULAR REACTOR AND METHOD FOR MULTI-PHASE POLYMERISATION

(71) Applicant: ARLANXEO Deutschland GmbH, Dormagen (DE)

(72) Inventor: Joachim Ritter, Leverkusen (DE)

( * ) Notice: Subject to any disclaimer, the term of this patent is extended or adjusted under 35 U.S.C. 154(b) by 0 days.

(21) Appl. No.: 15/548,516

(22) PCT Filed: Jan. 21, 2016

(86) PCT No.: PCT/EP2016/051222
§ 371 (c)(1),
(2) Date: Aug. 3, 2017

(87) PCT Pub. No.: WO2016/124411
PCT Pub. Date: Aug. 11, 2016

(65) Prior Publication Data
US 2018/0236428 A1 Aug. 23, 2018

(30) Foreign Application Priority Data
Feb. 6, 2015 (EP) .................................... 15154112

(51) Int. Cl.
*B01J 19/18* (2006.01)
*C08F 2/01* (2006.01)
(Continued)

(52) U.S. Cl.
CPC ......... *B01J 19/1837* (2013.01); *B01J 8/0015* (2013.01); *C08F 36/08* (2013.01);
(Continued)

(58) Field of Classification Search
CPC .... B01J 19/1837; B01J 8/0015; B01J 8/0045; B01J 2208/00761; B01J 2219/00094;
(Continued)

(56) References Cited

U.S. PATENT DOCUMENTS 1,693,786 A * 12/1928 Isaachsen ............ B01D 9/0013
23/301
4,395,523 A 7/1983 Kirch
(Continued)

FOREIGN PATENT DOCUMENTS

WO 03039739 A1 5/2003

OTHER PUBLICATIONS

International Search Report from International Application No. PCT/EP2016/051222, dated Apr. 1, 2016, three pages.

*Primary Examiner* — Lessanework Seifu
(74) *Attorney, Agent, or Firm* — Pepper Hamilton LLP

(57) ABSTRACT

The present invention relates to a tubular reactor (14) for multi-phase polymerization, in particular for producing butyl rubber, comprising a pipe piece (16) for radially delimiting a reactor volume between an inlet (18) and an outlet (20), a stirrer (22) for generating a flow (27) in the radial direction of the pipe piece (16), wherein the stirrer (22) is dimensioned and operable such that the flow (27) is impartable with a centrifugal force which generates a concentration distribution in the radial direction inside the pipe piece (16) and an outlet conduit (32) for discharging a concentrated radially inner part (30) of the flow (27, 28). Enrichment of polymer particles in the radially inner part (30) of the flow (27, 28) avoids gumming of the pipe piece (16) by the polymer particles so that the risk of a blockage is reduced.

20 Claims, 3 Drawing Sheets

Figure 1:
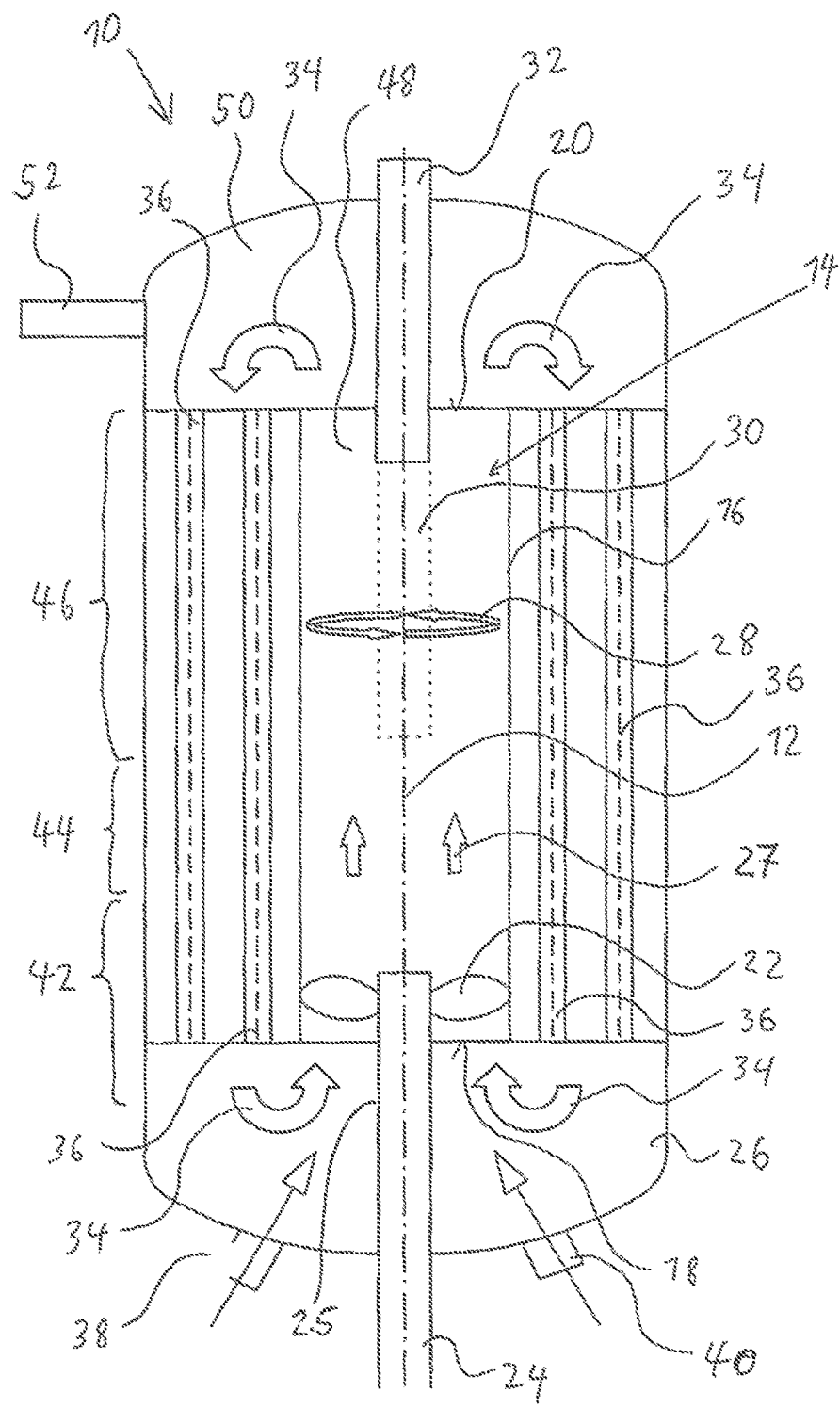

(51) Int. Cl.
  *B01J 8/00*      (2006.01)
  *C08F 110/10*    (2006.01)
  *C08F 36/08*     (2006.01)

(52) U.S. Cl.
  CPC ... *C08F 110/10* (2013.01); *B01J 2208/00761* (2013.01); *B01J 2219/00085* (2013.01); *B01J 2219/00094* (2013.01); *B01J 2219/00114* (2013.01); *B01J 2219/00247* (2013.01); *Y02P 20/582* (2015.11)

(58) Field of Classification Search
  CPC .... B01J 2219/00085; B01J 2219/00114; B01J 2219/00247; C08F 10/00; C08F 2/01
  See application file for complete search history.

(56) References Cited

U.S. PATENT DOCUMENTS

| | | | |
|---|---|---|---|
| 6,599,422 B2 * | 7/2003 | Constantine | B01D 17/00 210/512.3 |
| 7,740,808 B2 | 6/2010 | Vuorikari et al. | |
| 8,946,359 B2 | 2/2015 | Siraux et al. | |
| 2007/0078237 A1 | 4/2007 | McElvain et al. | |

* cited by examiner

TUBULAR REACTOR AND METHOD FOR MULTI-PHASE POLYMERISATION

The present invention relates to a tubular reactor which may be used to perform a multiphase polymerization and to a process for multiphase polymerization. The present invention relates in particular to a tubular reactor and to a process for producing butyl rubber by a polymerization of monomers using a catalyst in a liquid solvent.

EP 1 591 459 A1 discloses using a tubular loop reactor to perform a polymerization to produce polyolefins. To this end a suspension comprising solid polymer particles in a solvent is continually withdrawn from the loop reactor. The withdrawn stream is sent to a hydrocyclone to concentrate the polymer particles and subsequently to separate and purify them in a separating means. The solvent separated in the separating means and the solvent-rich proportion from the hydrocyclone which was not sent to the separating means is sent back to the loop reactor.

It is a disadvantage of such a reactor in such a process that the individual pipelines and particularly the reactor may easily become blocked. Particularly in the production of butyl rubber it is typically necessary to perform the polymerization at temperatures of −70 to −100° C. This temperature is near enough to the glass transition temperature of butyl rubber which is approximately −75° C. to −67° C. In the production of butyl rubber in particular there is therefore always a danger that due to the heat of reaction formed during the polymerization the butyl rubber particles are no longer glassy and in this state very easily adhere to surfaces. This results in blockage of the pipelines and in particular of a tubular reactor and it is therefore often necessary to interrupt the production of butyl rubber and subject the pipelines and the tubular reactor to costly and inconvenient cleaning.

The problem addressed by the invention is that of providing a tubular reactor and a process for multiphase polymerization, in particular for producing butyl rubber, where the danger of a blockage is reduced.

The problem is solved according to the invention by a tubular reactor comprising at least one pipe piece for radially delimiting a reactor volume between an inlet and an outlet, a stirrer for generating a flow in the axial direction of the pipe piece, wherein the stirrer is preferably dimensioned and operable such that the flow is impartable with a centrifugal force which generates a concentration distribution in the radial direction inside the pipe piece, and an outlet conduit for discharging a radially inner part of the flow.

The invention further comprises a process for multiphase polymerization, in particular for producing butyl rubber, comprising at least the steps of:

mixing a first reactant with a second reactant and/or a catalyst for performing a polymerization to afford a product in a solvent using a stirrer, imparting a centrifugal force at least to the product and the solvent using the same stirrer and withdrawing a concentrated radially inner part of the flow.

The inventive tubular reactor for multiphase polymerization which may be used in particular for producing butyl rubber comprises a pipe piece for radially delimiting a reactor volume between an inlet and an outlet. The tubular reactor comprises a stirrer for generating a flow in the axial direction of the pipe piece, wherein according to the invention the stirrer is dimensioned and operable such that the flow is impartable with a centrifugal force which generates a concentration distribution in the radial direction inside the pipe piece. An outlet conduit for discharging a concentrated radially inner part of the flow is also provided.

The stirrer of the tubular reactor thus achieves not only an axial flow and a mixing of a first reactant with a second reactant and/or further reactants and/or catalyst but also imparts a centrifugal force. In particular the proportion of centrifugal forces outweighs the proportion of inertial forces and weight forces in the axial direction and the proportion of frictional forces. Due to the imparted centrifugal force a concentration distribution takes place inside the tubular reactor so that an at least partial separation of the product from the unreacted reactants and/or the catalyst already takes place inside the tubular reactor. The product may further be concentrated so that the proportion of product based on a product/solvent mixture increases. It is particularly preferable when the product has a lower density than the solvent so that the product is concentrated in the interior of the tubular reactor. This avoids the product, for example butyl rubber, coming into contact with the pipe piece of the tubular reactor so that the inside of the tubular reactor cannot become gummed by product particles.

The risk of a blockage of the tubular reactor is thus reduced. It is furthermore not necessary to additionally send the contents of the tubular reactor to a hydrocyclone since the effect of a hydrocyclone may already be achieved inside the tubular reactor. This may be achieved with the same stirrer that is in any case provided to achieve axial conveying and mixing. This utilizes the finding that even at stirrer speeds required to achieve a sufficiently great concentration of the product a sufficiently turbulent flow is achieved in the immediate vicinity of the stirrer, thus resulting in a good mixing of the employed reactants/catalyst. Particularly in the production of butyl rubber the reaction rate is sufficiently high that the residence time in the turbulent region and mixed region is sufficient to achieve a high conversion and a good space-time yield. Particularly in the production of butyl rubber demixing and concentration of the product takes place only when the mixture is already approaching chemical equilibrium. The geometry of the pipe piece and of the stirrer may be chosen such that at least 60 weight percent, in particular at least 80 weight percent, of the theoretically possible product weight fraction calculated based on the chemical equilibrium may be achieved.

It is preferable when by virtue of the stirrer a biphasic layered rotational flow having at least two layers of different concentration is impartable in a separating region assigned to the outlet inside the pipe piece. The stirrer may be dimensioned and operable such that the layered rotational flow may be achieved inside the pipe piece. A Rankine vortex may result inside the pipe piece for example. The layers of the rotational flow are separated from one another in particular by a phase boundary and may each have different angular velocities. This results in partial volumes of different concentrations which are optically delimitable from one another. The geometry of the outlet conduit is in particular adapted to the expected geometry of the inner layer of the rotational flow. The outlet conduit may for example have an internal diameter equal to the external diameter of the inner layer or may have a smaller diameter. This ensures that a mass flow having a particularly high product concentration may be withdrawn via the outlet conduit.

The stirrer is preferably positioned adjacent to the inlet. Furthermore a first feed for introduction of a first reactant and a second feed for introduction of a second reactant and/or catalyst may be provided, wherein the first feed and the second feed open into the pipe piece in particular adjacent to the stirrer. Further feeds for the same reactant and/or further feeds for additional reactants may also be provided. As a result the reactants/catalyst may already be mixed with one another by the stirrer at the inlet of the pipe piece so that the entire length of the tubular reactor may be utilized effectively. A premature polymerization in the feed lines is avoided and excessively large particle sizes of the product may therefore be avoided. Instead, the dimensions of the pipe piece and of the stirrer may be used to adjust the residence time of the mixed reactants/catalyst in order to be able to achieve the narrowest possible molecular weight distribution. This facilitates subsequent separating operations in particular.

It is particularly preferable when the outlet conduit is immersed in the concentrated radially inner part of the flow inside the pipe piece. The outlet conduit is for example configured as an immersion tube whose entry opening is inside the concentrated radially inner part of the flow. This makes it possible to avoid crossmixing of the concentrated product with the remaining constituents of the flow taking place downstream of the outlet of the pipe piece of the tubular reactor on account of a change in cross section for example.

The stirrer is preferably an axially conveying stirrer which can impart a centrifugal force to the flow. To this end the stirrer is for example configured such that it can set the conveyed flow into rotation. The stirrer comprises for example a propeller, in particular precisely one propeller, which similarly to a ship's propeller can generate an axial flow and, simultaneously, a rotational flow. Via the rotational proportion of the flow the stirrer applies a tangential force to the flow that is sufficiently large to impart a centrifugal force to the flow which in the downstream region of the tubular reactor can result in demixing of the constitutents of the flow.

The stirrer is in particular joined to a shaft, in particular a perforated hollow shaft, wherein the shaft is preferably introducable into the tubular reactor via a shaft feedthrough and the shaft feedthrough is in particular washable with solvent. A reactant and/or catalyst may be supplied to the tubular reactor via the hollow shaft. Furthermore, a recirculated proportion of the flow, for example a concentrated solvent, may be recycled via the hollow shaft. Via the perforation in the hollow shaft the flow supplied via the hollow shaft can already communicate and mix with a flow outside the hollow shaft before reaching the stirrer. Accordingly, the reactant and/or catalyst and/or solvent may be supplied to the tubular reactor both from radially inside and from radially outside. Because solvent is preferably supplied to the shaft at the shaft feedthrough deposits are avoided and/or washed away.

It is particularly preferable when the internal diameter D of the pipe piece is adapted to the external diameter d of the stirrer. A gap between the pipe piece and the stirrer may therefore be kept as small as possible without risking jamming of the stirrer in the pipe piece. To this end, the ratio of the internal diameter D of the pipe piece to the external diameter d of the stirrer conforms to $1.0001 \leq D/d \leq 1.300$, in particular $1.0005 \leq D/d \leq 1.100$ and preferably $1.001 \leq D/d \leq 1.010$. By way of example the ratio $D/d = 1.005 \pm 0.001$.

It is particularly preferable when the outlet conduit is moveable in the axial direction to the pipe piece. This makes it possible to adapt the outlet conduit to different flow conditions inside the pipe piece, for example when the stirrer is to be operated at different speeds and/or with different power inputs and the concentration of the product in the axial direction of the pipe piece is shifted. This simultaneously facilitates assembly of the tubular reactor and assembly of the tubular reactor in another apparatus since the outlet conduit cannot collide with the pipe piece during assembly. This also makes it possible to run different product types.

The invention further relates to a heat exchanger which comprises a tubular reactor which may be configured and developed as described above. The tubular reactor is arranged substantially concentrically inside the heat exchanger, wherein the heat exchanger comprises at least one heat exchanger element for heat removal radially outside the tubular reactor. A loop flow is impartable inside the heat exchanger by virtue of the stirrer of the tubular reactor. It is therefore possible with only one stirrer to mix the reactants/catalyst, to concentrate the product and to provide a loop flow inside the heat exchanger. The loop flow may for example convey the solvent not discharged via the outlet conduit to the heat exchanger elements to cool the solvent. Since a large part of the concentrated product has already been removed via the outlet conduit the flow conveyed to the heat exchanger elements comprises hardly any polymer particles which could bring about gumming of the heat exchanger elements. This avoids deterioration of heat transfer in the heat exchanger elements. Changing of the heat exchanger elements and/or cleaning of the heat exchanger elements may therefore be eschewed or at least be performed at markedly longer intervals. This further increases productivity. Blockage of the passageways between the different heat exchanger elements are also avoided. The preferred separation of relatively large particles avoids blockage of the heat exchanger elements.

In a preferred embodiment the outlet conduit comprises a cooling means for cooling the outlet conduit.

The cooling means in particular comprises a preferably double-walled jacketed pipe for conducting a cooling medium. By way of example a cooling medium may flow in countercurrent along the outlet conduit, be deflected outward at the entry opening of the outlet conduit and flow back in cocurrent. The cooled outlet conduit makes it possible to prevent the product from heating up. In the production of butyl rubber in particular this avoids the situation where the butyl rubber concentrated via the outlet conduit no longer remains glassy and brings about gumming of the outlet conduit. This avoids blockage of the outlet conduit.

The invention further relates to a plant for multiphase polymerization which may in particular be used for producing butyl rubber. The plant comprises a heat exchanger for cooling a fluid. The plant further comprises a separating means for separation of a product. A recycling conduit is connected to an exit of the separating means and the heat exchanger. The heat exchanger and/or the recycling conduit comprises a tubular reactor which may be configured and developed as described above. The outlet conduit of the tubular reactor is connected to an entrance of the separating means. The heat exchanger may in particular be configured and developed as described above. The tubular reactor avoids the polymer particles adhering to and blocking the recycling conduit and/or elements of the heat exchanger. The risk of a blockage is thus reduced and the plant may therefore be operated more productively. It is in particular possible to operate the plant continuously over a longer period without having to perform cleaning operations. It is also possible to provide more than one heat exchanger connected in series and/or parallel in order for example to divide the mass flow to be cooled over a plurality of smaller heat exchangers and/or to perform a multi-stage cooling to achieve a particularly large temperature difference during cooling. It is also possible to provide a plurality of separating means connected in parallel and/or in series in order to divide the product mass flow over a plurality of smaller separating means and/or to perform a multi-stage separation with a particularly high degree of purity. The separating means may in particular comprise a flash unit, a stripper and/or a distillation column. A purge conduit, in particular connected to the heat exchanger, may also be provided to avoid concentration of undesired impurities in the solvent.

The invention further relates to a process for multiphase polymerization, in particular for producing butyl rubber, comprising the steps of mixing a first reactant with a second reactant and/or a catalyst for performing a polymerization to afford a product in a solvent using a stirrer, imparting a centrifugal force at least to the product and the solvent using the same stirrer and withdrawing a concentrated radially inner part of the flow. Because the stirrer is used not only for mixing but also for imparting a centrifugal force there results a concentrated radially inner part of the flow from which the concentrated product may be withdrawn. Since the product in particular has a lower density than the solvent the polymer particles formed during the polymerization can become concentrated in the interior of the flow so that they cannot adhere to components that radially delimit the flow. This reduces the risk of blockage of tubular components in particular. The process can therefore be operated continually over a longer period without cleaning and maintenance operations being required. This results in higher productivity of the process.

It is preferable when during imparting of the centrifugal force a rotational flow is generated, wherein the rotational flow is in particular a biphasic layered rotational flow having at least two layers of different concentrations. The rotational flow makes it possible to facilitate concentration of the product, which in particular makes it possible to generate inside the flow two layers separated from one another by a phase boundary. This facilitates withdrawal of the concentrated product.

In particular at least the solvent is cooled. The solvent is cooled preferably after the imparting of the centrifugal force and particularly preferably after the withdrawal of the concentrated radially inner part of the flow. This makes it possible to cool as few polymer particles formed during the polymerization as possible. Since the heat transfer to the solvent is better than the heat transfer to the polymer particles this allows more efficient cooling to be achieved. Furthermore, the recirculated cooled solvent can fully engulf the polymer particles formed during the polymerization and it is therefore particularly simple and efficient to remove the heat of reaction formed during the polymerization from the polymer particles formed. The solvent is particularly preferably conveyed via a loop flow to at least one heat exchanger element for heat removal, wherein the loop flow is preferably imparted using the same stirrer. As a result only one stirrer is required to provide the loop flow required for cooling the solvent. An additional conveying means is not required.

The stirrer is particularly preferably operated such that for the ratio $c = w_{tan} 2/((d/2) \cdot g)$ where $w_{tan}$ denotes tangential velocity at the outer edge of the stirrer, d denotes external diameter of the stirrer and g denotes acceleration due to gravity, $c \geq 10$, in particular $c \geq 100$ and preferably $c \geq 1000$. It is preferable when $c \leq 10000$. This operating mode of the stirrer makes it possible to ensure that the stirrer not only achieves mixing but also achieves concentration in a radially inner part of the flow imparted by the stirrer.

The process particularly preferably employs a tubular reactor which may be configured and developed as described above. Alternatively or in addition the process may employ a heat exchanger which may be configured and developed as described above. Alternatively or in addition the process may employ a plant which may be configured and developed as described above. The tubular reactor used here, which is in particular arranged inside the heat exchanger, makes it possible using the appropriately operated stirrer to force a suitable flow inside the pipe piece of the tubular reactor which after polymerization automatically brings about concentration of the product formed.

The invention is now elucidated by way of example using preferred exemplary embodiments with reference to the accompanying drawings.

Figure 2:
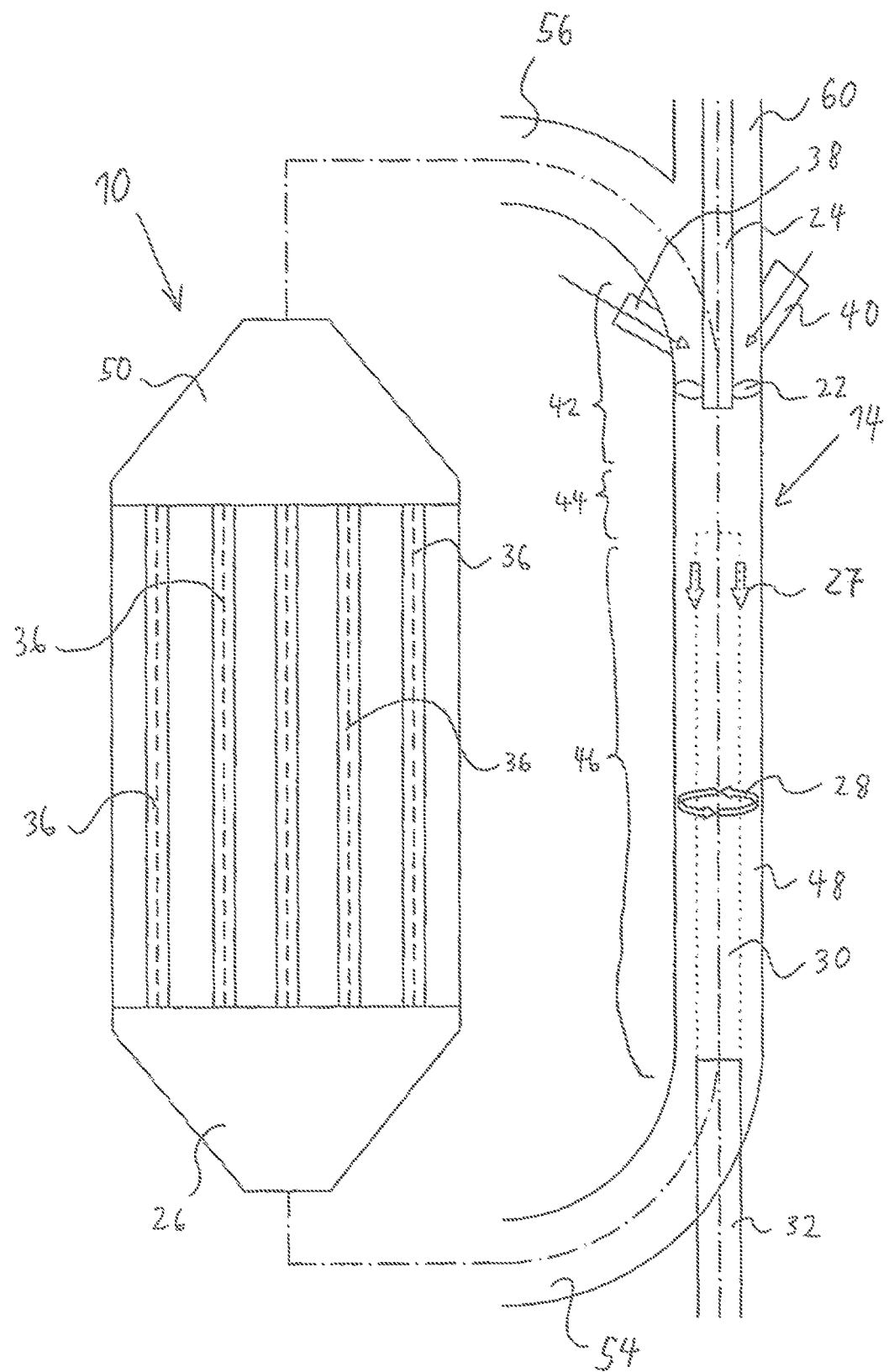
Figure 3:
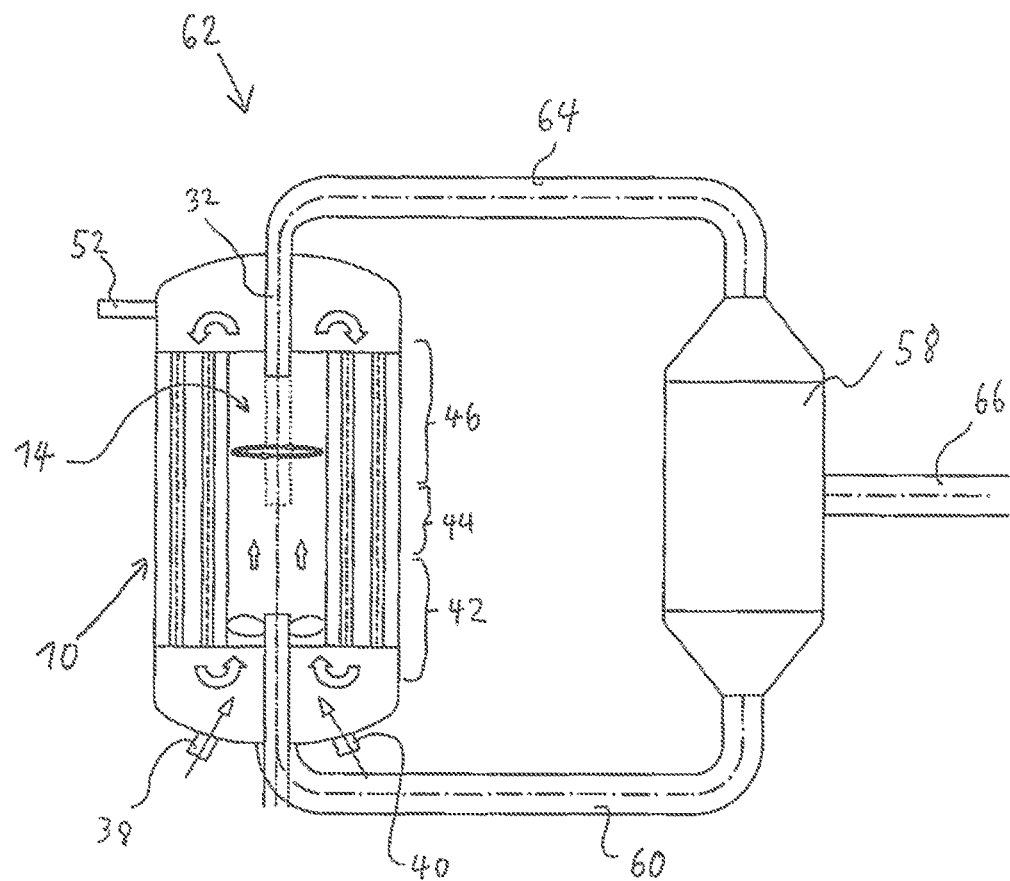

FIG. 1: shows a schematic side view of a heat exchanger comprising a tubular reactor according to the invention, FIG. 2: shows a schematic side view of a tubular reactor according to the invention in a further embodiment and FIG. 3: shows a schematic side view of a plant for multiphase polymerization comprising the heat exchanger from FIG. 1.

The heat exchanger 10 depicted in FIG. 1 comprises a tubular reactor 14 arranged concentrically to a central axis 12. The tubular reactor 14 comprises a pipe piece 16 which leads from an inlet 18 to an outlet 20. The tubular reactor 14 comprises a stirrer 22 which in the exemplary embodiment shown is a propeller. The stirrer 22 is driven by a shaft 24 which projects downward from a bottom 26 of the heat exchanger 10. The shaft 24 is introduced via a shaft feedthrough 25 into the heat exchanger 10, wherein in particular solvent is supplied via the shaft feedthrough 25 to avoid and wash away deposits. The shaft 24 subjects the stirrer 22 to a speed which is sufficient to generate not only an axial flow 27 but also a rotational flow 28. The rotational flow 28 imparts the axial flow 27 with a centrifugal force which results in a concentration distribution in the radial direction inside the pipe piece 16. This concentration distribution results in the upper region of the tubular reactor 14, i.e., adjacent to outlet 20, in a layered rotational flow 28 which has an inner part 30 in which the product, in particular butyl rubber, has become concentrated. The concentrated product may be withdrawn via an outlet conduit 32 immersed in the inner part 30.

The proportion of the axial flow 27 which is not withdrawn via outlet conduit 32 flows past outlet conduit 32 and is diverted along a loop flow 34. The diverted loop flow 34 which is particularly rich in solvent and catalyst flows past heat exchanger elements 36 which cool loop flow 34.

In the bottom 26 a first product, for example 20 monomer, is supplied via a first feed 38. A second reactant and/or catalyst is supplied via a second feed 40. The reactants and/or the catalyst are in particular dissolved in a liquid solvent. The stirrer 22 mixes the reactants/catalyst supplied via the first feed 38 and the second feed 40 in a mixing zone 42 so that they react with one another in the mixing zone 42. The mixture of products, reactants and/or catalyst then flows into an intermediate zone 44 in which the mixture can react further but a demixing with a concentration profile in the radial direction is already becoming established. In a swirling zone 46 a rotational flow becomes established which comprises in particular an inner layer comprising the inner concentrated part 30 and a solvent-rich part 48.

The flow 27 may be supplied via a further feed (not shown) with a recycling stream removed during a cleaning of the concentrated product removed via the outlet conduit 32. The recycling stream may further be supplied via the first feed 38 and/or the second feed 40. It is also possible to configure shaft 24 as a hollow shaft and to supply the recycling stream and/or reactant and/or catalyst via the shaft 24 configured as a hollow shaft. It is preferable to supply solvent at the shaft feedthrough 25 of the shaft 24 to avoid and/or wash away deposits.

The heat exchanger 10 further comprises a top 50 connected to a purge conduit 52. A solvent-rich flow may be discharged via the purge conduit 52 to avoid concentration of the contents of the heat exchanger 10 and of the tubular reactor 14 with undesired impurities or byproducts.

Compared to the embodiment depicted in FIG. 1 in the embodiment depicted in FIG. 2 the tubular reactor 14 is arranged outside the heat exchanger 10. Here, the flow conducted past the outlet conduit 32 is supplied via a feed 54 to the heat exchanger 10 where the flow is cooled via heat exchanger elements 36. The heat exchanger 10 may in this case be traversed linearly and via a return line 56 sent back to the tubular reactor 14 to absorb the heat of reaction formed. It is likewise possible for solvent removed from the product stream withdrawn via the outlet conduit 32 in a separation means 58 (FIG. 3) to be sent back to the tubular reactor 14 via a recycling conduit 60. In the embodiment depicted in FIG. 2 the tubular reactor 14 is arranged in the recycling conduit 60, wherein a part of the recycling conduit 60 forms the pipe piece 16 of the tubular reactor 14.

In the plant 62 depicted in FIG. 3 the heat exchanger 10 depicted in FIG. 1 and comprising a tubular reactor 14 is connected to a separating means 58. The heat exchanger 10 may alternatively be replaced with the arrangement depicted in FIG. 2. The outlet conduit 32 of the tubular reactor 14 is connected with the separating means 58 via a separating conduit 64. In the separating means 58 the product supplied via the separating conduit 64 is for example purified using a distillation and divided into at least two substreams. The purified product leaves the separating means 58 via a product conduit 66 for storage and/or further refining and/or packing of the product. The separated constituents which are in particular rich in solvent and may comprise catalyst and/or unreacted reactants are supplied to the tubular reactor 14 via the recycling conduit 60 via the heat exchanger 10.

What is claimed is:

1. A tubular reactor for multiphase polymerization, in particular for producing butyl rubber, the tubular reactor comprising:
    a pipe piece having an inlet and an outlet disposed axially from the inlet, the pipe piece radially delimiting a reactor volume between the inlet and the outlet thereof, the inlet comprising a first feed for introduction of a first reactant and a second feed for introduction of a second reactant and/or catalyst, wherein the first feed and the second feed open into the pipe piece,
    a stirrer positioned adjacent to the inlet for generating a flow in an axial direction of the pipe piece, wherein the flow has a radially inner part and a radially outer part, and the stirrer is dimensioned and operable to impart a centrifugal force on the flow to generate a concentration distribution in the flow in a radial direction inside the pipe piece, and
    an outlet conduit for discharging at least a portion of the radially inner part of the flow.

2. The tubular reactor as claimed in claim 1, wherein the outlet comprises a separating region inside the pipe piece, and, by virtue of the stirrer, a biphasic layered rotational flow having at least two layers of different concentration is impartable to the flow in the separating region.

3. The tubular reactor as claimed in claim 1, wherein the outlet conduit has an entry opening disposed within the pipe piece, for immersion in the concentrated radially inner part of the flow inside the pipe piece.

4. The tubular reactor as claimed in claim 1, wherein the stirrer is joined to a shaft, in particular a perforated hollow shaft, wherein the shaft is preferably introducible into the tubular reactor via a shaft feedthrough and the shaft feedthrough is in particular washable with solvent.

5. The tubular reactor as claimed in claim 1, wherein the pipe piece defines an internal diameter (D) and the stirrer defines an external diameter (d), and a ratio of the internal diameter D of the pipe piece to the external diameter d of the stirrer conforms to $1.0001 \leq D/d \leq 1.300$.

6. The tubular reactor as claimed in claim 1, wherein the outlet conduit comprises a cooling means for cooling the outlet conduit, wherein the cooling means comprises a double-walled jacketed pipe for conducting a cooling medium.

7. The tubular reactor as claimed in claim 1, wherein the outlet conduit is moveable in the axial direction relative to the pipe piece.

8. The tubular reactor as claimed in claim 1, further comprising a heat exchanger disposed about at least a portion of the pipe piece, wherein the heat exchanger comprises at least one heat exchanger element for heat removal radially outside the pipe piece, wherein a loop flow is impartable within the heat exchanger element and pipe piece by virtue of the stirrer of the tubular reactor.

9. A plant for multiphase polymerization, in particular for producing butyl rubber, the plant comprising:
    the tubular reactor as claimed in claim 1,
    a heat exchanger for cooling a fluid,
    a separating device for separating a product, and
    a recycling conduit connected to an exit of the separating device and the heat exchanger
wherein at least one of the heat exchanger and the recycling conduit comprises the tubular reactor disposed therein, and the outlet conduit of the tubular reactor is connected with an entrance of the separating device.

10. A process for multiphase polymerization that is conducted in the tubular reactor of claim 1, the process comprising:
    mixing a first reactant with a second reactant and/or a catalyst to produce a mixture comprising polymerized product in a solvent,
    imparting a centrifugal force to the mixture to produce a concentration gradient of at least the product in the solvent, and
    withdrawing a concentrated radially inner part of the mixture.

11. The process as claimed in claim 10, further comprising generating a rotational flow of the mixture for imparting the centrifugal force, wherein the rotational flow is a biphasic layered rotational flow having at least two layers of different concentrations.

12. The process as claimed in claim 10, further comprising cooling at least the solvent, wherein the cooling comprises conveying at least the solvent, after the imparting of the centrifugal force and after the withdrawal of the concentrated radially inner part of the flow mixture, via a loop flow, to at least one heat exchanger element for heat removal, wherein the loop flow and rotational flow is imparted using a stirrer.

13. The process as claimed in claim 12, wherein the stirrer is operated such that for the ratio $c = w_{tan}^2/((d/2) \cdot g)$, where $w_{tan}$ denotes tangential velocity at the outer edge of the stirrer, d denotes an external diameter of the stirrer, and g denotes acceleration due to gravity, and $c \geq 10$.

14. The method of claim 13, wherein $c \geq 100$.

15. The method of claim 13, wherein $c \geq 1000$.

16. A tubular reactor comprising:

a tubular member having:

a first end comprising an inlet for introducing material into the tubular member, the inlet comprising a first feed for introduction of a first reactant and a second feed for introduction of reactant and/or catalyst, wherein the first feed and the second feed open into the tubular member;

a second end spaced axially from the first end and comprising an outlet for removal of material from the tubular member, the tubular member being configured for conducting a flow of material from the inlet to the outlet and radially delimiting a reactor volume between the inlet and the outlet;

a system positioned adjacent to the inlet for imparting centrifugal motion to material flowing between the inlet and the outlet to produce a centrifugal force and generate, in a radial direction inside the tubular member, a concentration gradient of material in the flow of material; and an outlet conduit adjacent the outlet end and configured for removal of a radially inner part of the flow of material.

17. The tubular reactor as claimed in claim 16, wherein:

the material comprises at least one component in a solvent;

the flow of material, towards the second end, by virtue of the centrifugal force, comprises at least two layers of different concentration of the at least one component and solvent; and the radially inner part of the flow, removed via the outlet conduit, comprises a higher concentration of the at least one component in the solvent.

18. The tubular reactor as claimed in claim 17, wherein:

the material introduced at the inlet comprises reactants;

the inlet comprises a feed for introduction of the reactants into the tubular member, whereupon a reaction occurs to produce a mixture comprising at least a product in a solvent;

the at least two layers comprise at least two layers of different concentration of the product in the solvent; and the radially inner part of the flow of material removed by the outlet conduit comprises the product in the solvent.

19. The tubular reactor as claimed in claim 18, wherein an intake end of the outlet conduit is configured to be immersed in the concentrated radially inner part of the flow inside the tubular member, and the outlet conduit is axially displaceable within the tubular member for axial displacement of the intake end within the flow of material.

20. The tubular reactor as claimed in claim 5, wherein the ratio of the internal diameter D of the pipe piece to the external diameter d of the stirrer conforms to $1.001 \leq D/d \leq 1.010$.

* * * * *